United States Patent [19]
Kominami et al.

[11] Patent Number: 6,147,461
[45] Date of Patent: Nov. 14, 2000

[54] OPERATING APPARATUS OF DISCHARGE LAMP

[75] Inventors: Satoshi Kominami, Katano; Koji Miyazaki, Hirakata, both of Japan

[73] Assignee: Matsushita Electric Industrial Co., Ltd., Kadoma, Japan

[21] Appl. No.: 09/270,315

[22] Filed: Mar. 16, 1999

[30] Foreign Application Priority Data

Mar. 18, 1998 [JP] Japan .................................. 10-068058

[51] Int. Cl.[7] ........................................................ G05F 1/00
[52] U.S. Cl. .................... 315/291; 315/307; 315/DIG. 7
[58] Field of Search .................... 315/291, 246, 315/209 R, 307, DIG. 5, 287, 362, DIG. 7

[56] References Cited

U.S. PATENT DOCUMENTS

| | | | |
|---|---|---|---|
| 5,198,727 | 3/1993 | Allen et al. | 315/291 |
| 5,773,937 | 6/1998 | Miyazaki et al. | 315/246 |
| 5,880,561 | 3/1999 | Miyazaki et al. | 315/209 R |

FOREIGN PATENT DOCUMENTS

| | | |
|---|---|---|
| 0 713 352 A2 | 5/1996 | European Pat. Off. . |
| 0 825 808 A2 | 2/1998 | European Pat. Off. . |
| 0709835 | 2/1959 | Japan . |
| 03049147 | 3/1991 | Japan . |
| 0714684 | 1/1995 | Japan . |
| 08148285 | 6/1996 | Japan . |
| 08195288 | 7/1996 | Japan . |
| 09063783 | 3/1997 | Japan . |
| 10326681 | 12/1998 | Japan . |

*Primary Examiner*—Don Wong
*Assistant Examiner*—Tuyet T. Vo
*Attorney, Agent, or Firm*—Renner, Otto, Boisselle & Sklar

[57] ABSTRACT

An operating apparatus of a discharge lamp for operating the discharge lamp having an arc tube defining a discharge space includes: generation means for generating a first waveform signal having a frequency component of an acoustic resonance frequency exciting a mode which straightens an arc discharge, a center line of a waveform of the first waveform signal being maintained at a fixed level; and modulation means for modulating the first waveform signal periodically so that a polarity of the center line of the first waveform signal changes alternately at a modulation frequency which is lower than the acoustic resonance frequency, and generating a modulated signal. A modulation depth $\alpha/\beta$, where $\alpha$ is a peak-to-peak amplitude of the first waveform signal and $\beta$ is an effective value of an amplitude of the modulated signal, is set at such a value that a sealed material in the arc tube is prevented from adhering to a center portion of the arc tube in substantially a strip shape.

7 Claims, 14 Drawing Sheets

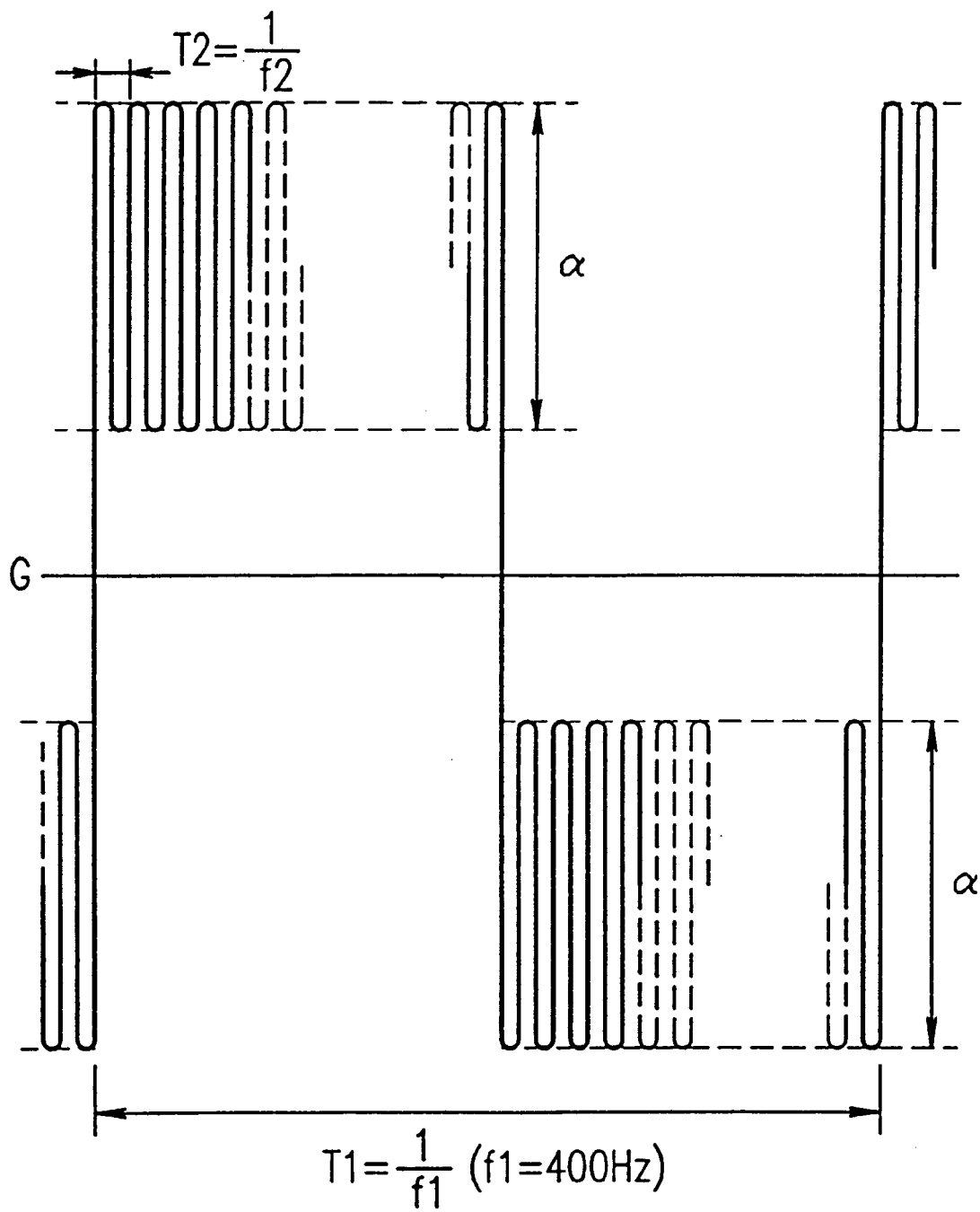

FIG. 2A
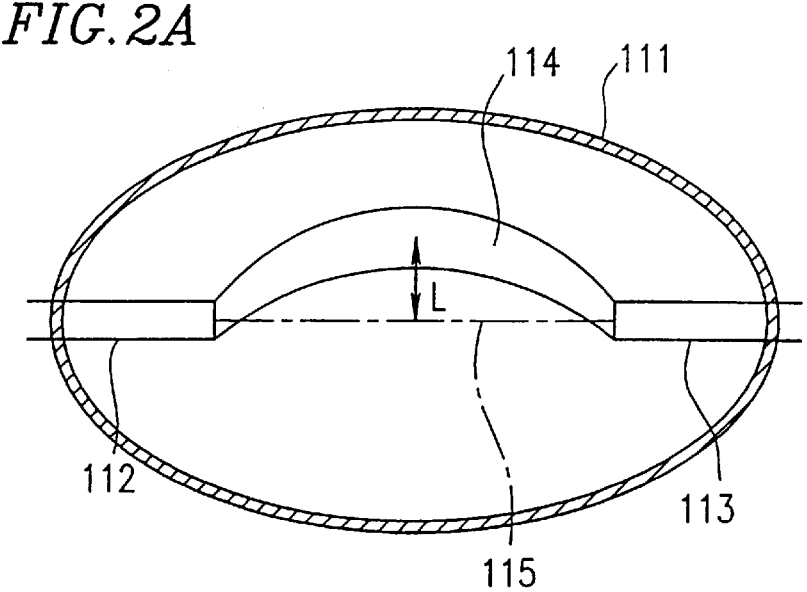
FIG. 2B
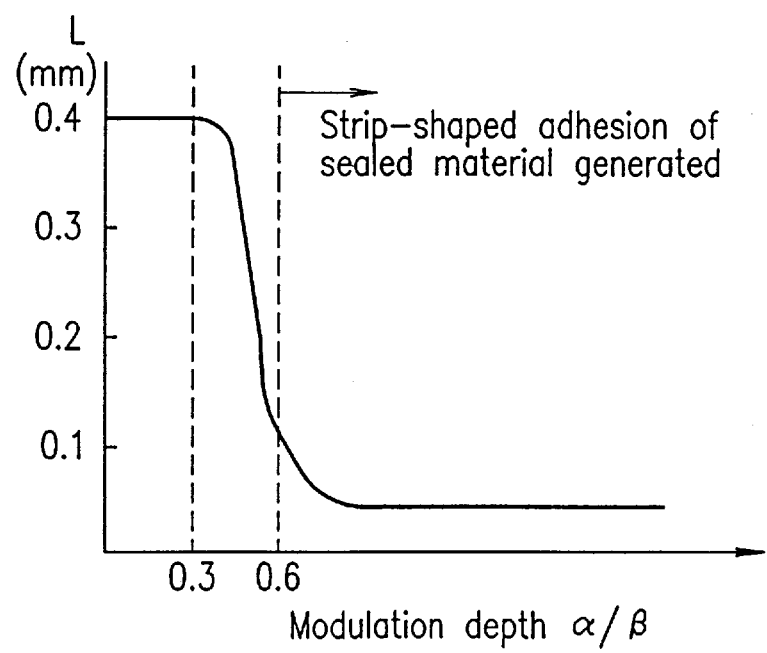
FIG. 2C
| α/β | Below 0.6 | Above 0.6 |
|---|---|---|
| State of sealed material | | |

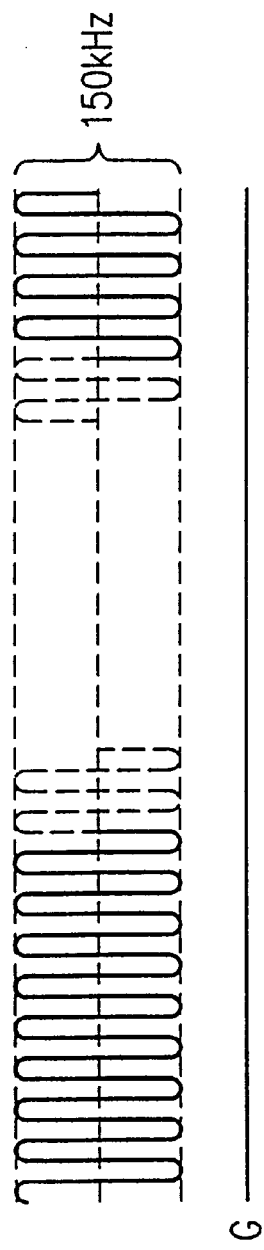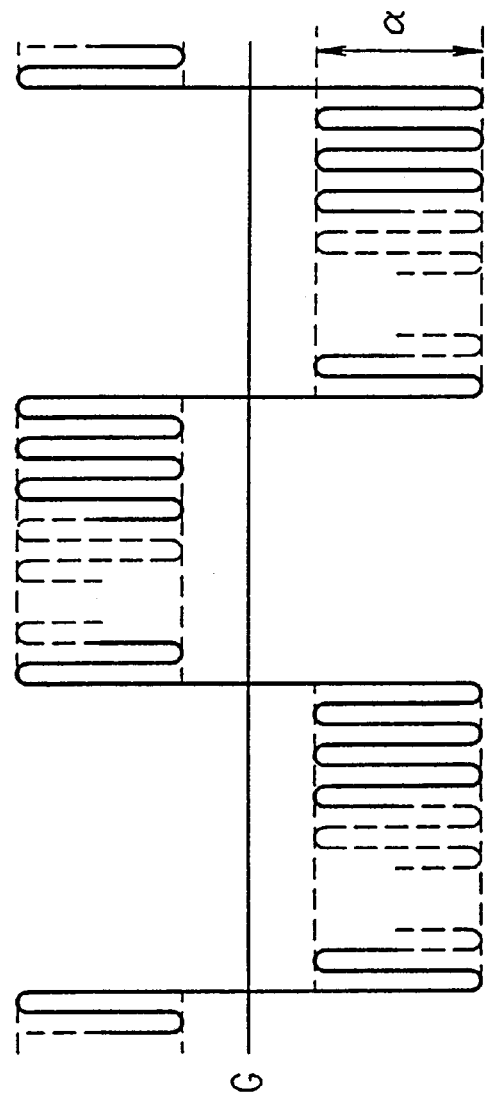
FIG. 9A
FIG. 9B

OPERATING APPARATUS OF DISCHARGE LAMP

BACKGROUND OF THE INVENTION

1. Field of the Invention

The present invention relates to an operating apparatus of a discharge lamp, and more particularly, relates to an operating apparatus for generating a substantially straight arc discharge by utilizing acoustic resonance in a high intensity discharge (HID) lamp. More specifically, the present invention relates to an operating apparatus of a discharge lamp capable of eliminating a variation in color of the arc discharge caused by cataphoresis and preventing deterioration in the transparency of an arc tube, which is otherwise caused by adhesion of a sealed material in the arc tube to the inner wall of the arc tube in a strip shape surrounding the arc discharge substantially at the center portion of the arc tube, thereby realizing a longer life discharge lamp.

2. Description of the Related Art

An HID lamp has been receiving attention as a light source for exterior illumination or interior illumination, and particularly as a light source for illuminating a commercial store, in view of its high brightness, high efficiency, excellent color rendering property, long life and the like. Recently, a smaller HID lamp which consumes less power has particularly attracted much attention as a light source for a video apparatus or a light source for automobile headlights.

In general, when the above type of discharge lamp is operated while being disposed horizontally, the arc discharge is curved upwardly due to the influence of convection resulting from a temperature distribution generated in the arc tube. When the arc discharge is curved, the high temperature arc discharge of about 5000 K becomes closer to the upper portion of the arc tube. As a result, the temperature of the upper portion of the arc tube becomes higher than that of the lower portion of the arc tube. Therefore, transparency in the upper portion of the arc tube deteriorates faster than that in the lower portion of the arc tube (i.e., transparency is lost). The upper portion of the arc tube also expands thermally. These cause earlier deterioration of the arc tube, adversely influencing the life of the discharge lamp. Particularly in a small low-power HID lamp, the distance between the arc discharge and the arc tube becomes shorter, and thus, the curvature of the arc discharge as described above has greater impact on the life of the discharge lamp.

Moreover, when the arc discharge is curved, the shape of the arc discharge becomes asymmetric between the upper and lower portions of the arc tube. As a result, in the case where the HID lamp is used in combination with a reflecting mirror, such arc curvature must be taken into consideration in optical design. Consequently, such optical design becomes extremely complex and time-consuming.

As a technique for eliminating such arc curvature, methods for operating a discharge lamp by utilizing acoustic resonance are proposed in Japanese Publication for Opposition No. 7-9835 and Japanese Laid-Open Publication No. 7-14684.

Specifically, in Japanese Publication for Opposition No. 7-9835, a discharge lamp is supplied with a current having a waveform as shown in FIG. 13 where an AC current 52 with a frequency which can reduce the influence of convection by means of acoustic resonance to straighten the arc discharge is superposed on a DC current 51. By supplying such a current, the arc curvature is reduced and a substantially straight arc discharge is realized. In FIG. 13, line G represents a ground level, which is also applied to other waveform diagrams used for description of the present invention.

Japanese Laid-Open Publication No. 7-14684 discloses that arc curvature caused by the influence of convection can be eliminated in the following manner. An AC current having such a frequency and waveform in the range of about 10 kHz to about 100 kHz that causes acoustic resonance to be excited in a radial direction in an arc tube is supplied to a discharge lamp. A frequency $F_V$ of the AC current is selected so as to satisfy the following relationship between the frequency $F_V$ of the AC current and a frequency $F_R$ of an acoustic wave in a radial direction:

$$N \cdot 2F_2 = m \cdot F_R$$

$$F_R = 3.83 \, C/(2\pi R)$$

wherein n and m are integers; C is the velocity of sound in a radial direction in the arc tube; and R is an inner diameter of the arc tube. The publication describes that the arc curvature due to the influence of convection can be eliminated by following the above scheme.

Acoustic resonance is a phenomenon caused by the generation of a standing wave of a compression wave in the arc tube when a natural frequency of a discharge lamp, determined depending on a sealed material in the arc tube and the shape of the arc tube, becomes substantially equal to a frequency of a periodic change in electric power which is input to the discharge lamp. In general, such acoustic resonance causes instability or extinction of arc discharge, bursting of arc tube, and the like. Therefore, conventionally, it has been typically attempted to avoid the generation of acoustic resonance.

In general, acoustic resonance has three kinds of modes, i.e., a radial direction mode, an axial direction mode, and a circumferential direction mode. Among the above three modes, the methods disclosed in Japanese Publication for Opposition No. 7-9835 and Japanese Laid-open Publication No. 7-14684 utilize acoustic resonance in a radial direction.

However, it was found from a study made for the present application that a satisfactory operation state of a discharge lamp is not always realized by the operating method utilizing acoustic resonance disclosed in Japanese Publication for Opposition No. 7-9835 or Japanese Laid-Open Publication No. 7-14684.

More specifically, in the discharge lamp operating apparatus disclosed in Japanese Publication for Opposition No. 7-9835, while the intensity of electric field in the discharge space of the discharge lamp periodically changes in correspondence with the superposed AC current 52, the direction of electric field is maintained in one direction since the current always flows in one direction in the discharge lamp. As a result, cataphoresis occurs where the distribution of a sealed material becomes unbalanced in the arc tube of the discharge lamp, causing variation in the color of the arc discharge generated.

In the discharge lamp operating apparatus disclosed in Japanese Laid-Open Publication No. 7-14684, as schematically shown in FIG. 14, when an arc discharge (not shown) is generated between electrodes 142 and 144, a sealed material in a liquid phase, which does not evaporate, in an arc tube 140 of the discharge lamp adheres to the inner wall of the center portion of the arc tube in a strip shape surrounding the arc discharge (indicated by the reference numeral 146). This phenomenon presumably occurs due to the following reason. While the arc discharge is straightened by acoustic resonance in a radial direction, the density of the sealed material becomes high in the center portion of the arc tube 140 by a different mode of acoustic resonance, i.e., acoustic resonance in an axial direction. The concentrated sealed material thus adheres to the inner wall of the arc tube 140 in a strip shape.

When the sealed material adheres to the inner wall of the center portion of the arc tube 140 in a strip shape surrounding the arc discharge as described above, a chemical reaction between the quartz glass constituting the arc tube 140 and the sealed material is accelerated in the strip-shaped adhesion portion 146. The transparency of the strip-shaped adhesion portion 146 is thus lost, reducing the lumen flux. As a result, the life of the discharge lamp is shortened. In addition, since a discharge lamp is generally used in combination with a reflecting mirror, the light utilizing efficiency of the discharge lamp when combined with the reflecting mirror is reduced if such a strip-shaped adhesion portion 146 where the transparency is lost exists at the center of the arc tube 140.

Japanese Laid-Open Publication No. 10-326681 (corresponding to EP-A-0825808) discloses a technique for suppressing the generation of cataphoresis which arises as problem in Japanese Publication for Opposition No. 7-9835. According to the disclosed technique, a discharge lamp is operated by an operating apparatus which outputs a current having a synthetic wave including a waveform with a frequency component of an acoustic resonance frequency exciting an arc-straightening mode, and a waveform of which the polarity alternately changes at a frequency lower than the acoustic resonance frequency. The publication describes that, using such an operating apparatus, arc curvature is minimized thereby generating a straight arc discharge and variation in the arc color caused by cataphoresis is eliminated.

However, Japanese Laid-Open Publication No. 10-326681 (corresponding to EP-A-0825808) described above fails to consider the problem of adhesion of a sealed material to the inner wall of the center portion of the arc tube. The disclosed technique therefore has the same disadvantages as that described above in relation to Japanese Laid-Open Publication No. 7-14684.

SUMMARY OF THE INVENTION

An operating apparatus of a discharge lamp for operating the discharge lamp having an arc tube defining a discharge space, in accordance with the invention, includes: generation means for generating a first waveform signal having a frequency component of an acoustic resonance frequency exciting a mode which straightens an arc discharge, a center line of a waveform of the first waveform signal being maintained at a fixed level; and modulation means for modulating the first waveform signal periodically so that a polarity of the center line of the first waveform signal changes alternately at a modulation frequency which is lower than the acoustic resonance frequency, and generating a modulated signal. A modulation depth $\alpha/\beta$, where $\alpha$ is a peak-to-peak amplitude of the first waveform signal and $\beta$ is an effective value of an amplitude of the modulated signal, is set at such a value that a sealed material in the arc tube is prevented from adhering to a center portion of the arc tube in substantially a strip shape.

The acoustic resonance frequency may be determined by the velocity of sound in a medium in the discharge space of the discharge lamp and a length of the discharge space intersecting the arc discharge.

The sealed material may include at least a metal halide or mercury.

Preferably, the value of the modulation depth $\alpha/\beta$ is equal to or less than about 0.6. More preferably, the value of the modulation depth $\alpha/\beta$ is in the range from about 0.3 to about 0.6.

In one embodiment, the operating apparatus further includes modulation depth control means for detecting a state of strip-shaped adhesion of the sealed material to a wall of the arc tube during the operation of the discharge lamp and changing the value of the modulation depth $\alpha/\beta$ depending on the detection results.

The modulation depth control means may detect a light output from the discharge lamp.

Thus, the invention described herein makes possible the advantage of providing an operating apparatus for a discharge lamp capable of eliminating variation in the arc color and generating a substantially straight arc discharge with reduced arc curvature by eliminating the occurrence of cataphoresis, and preventing a sealed material in an arc tube from adhering to the inner wall of the center portion of the arc tube in a strip shape which tends to cause a loss of transparency in the strip-shaped adhesion portion, thereby realizing a longer life discharge lamp.

This and other advantages of the present invention will become apparent to those skilled in the art upon reading and understanding the following detailed description with reference to the accompanying figures.

BRIEF DESCRIPTION OF THE DRAWINGS

FIG. 1 is a view illustrating a waveform of a composite wave including a sine wave with an acoustic resonance frequency f2 exciting an arc-straightening mode (first waveform signal) and a rectangular wave of which the polarity changes alternately at a frequency f1 lower than the acoustic resonance frequency f2;

FIG. 2A is a view for describing a method for measuring a curvature size L of an arc discharge generated, FIG. 2B is a graph showing the variation in the measured curvature size L of the arc discharge, and FIG. 2C is a view illustrating the state of adhesion of a sealed material to an arc tube during the operation of a discharge lamp;

FIG. 5A shows a waveform output from a rectangular wave generator, FIG. 5B shows a waveform output from a sine wave generator, and FIG. 5C shows a waveform output from a wave synthesizer which superposes the output of the sine wave generator and the output of the rectangular wave generator;

FIG. 7A shows a waveform output from a DC power supply, FIG. 7B shows a waveform output from a high frequency supply, FIG. 7C shows a waveform output from a superposing circuit, and FIG. 7D shows a waveform output from a rectangular wave conversion circuit;

FIGS. 9A and 9B are views illustrating waveforms of currents output from components of the apparatus shown in FIG. 8; FIG. 9A shows a waveform output from a DC power supply, and FIG. 9B shows a waveform output from a rectangular wave conversion circuit;

DESCRIPTION OF THE PREFERRED EMBODIMENTS

Figure 3:
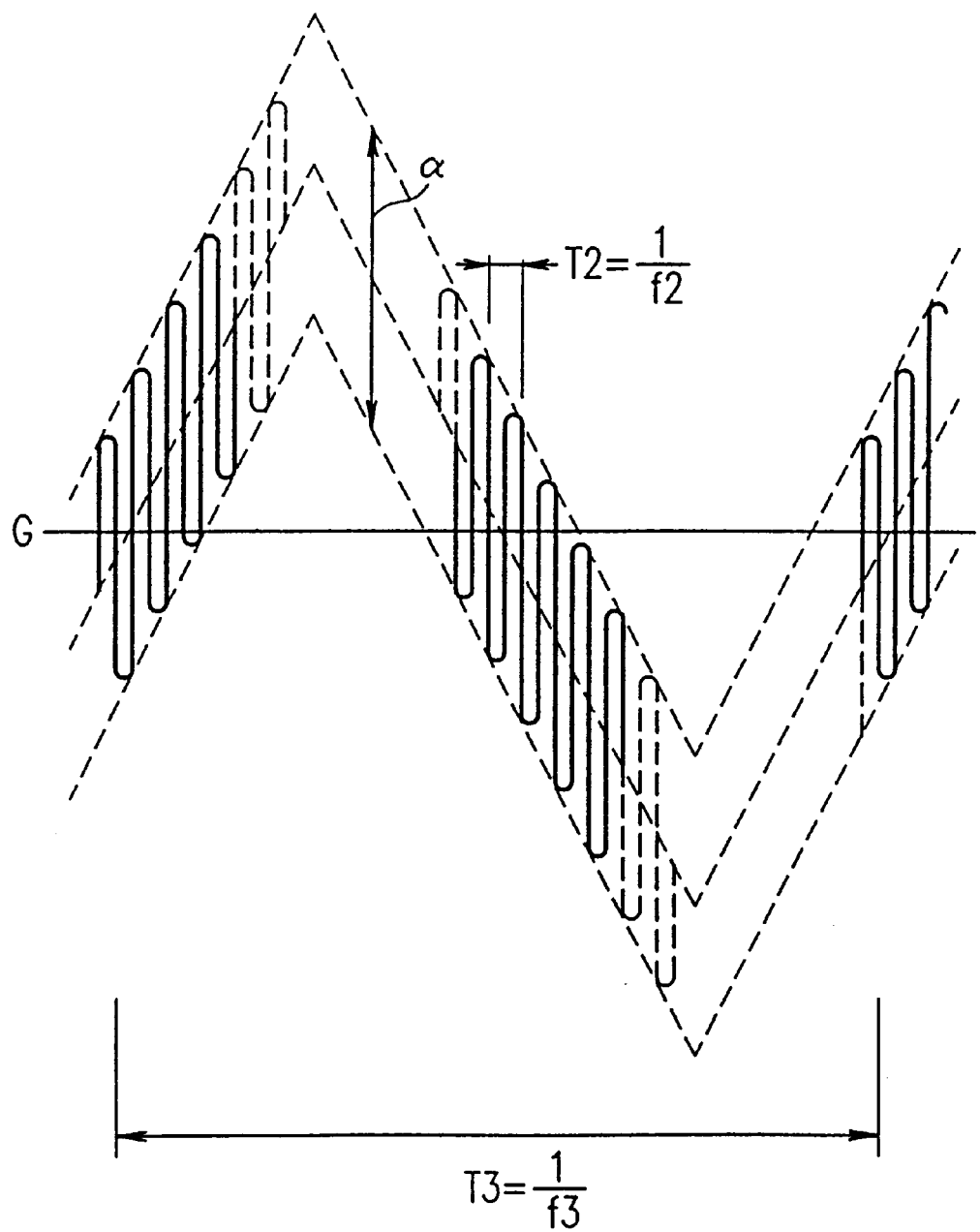
FIG. 3 is a view illustrating a waveform of a composite wave including a sine wave with the acoustic resonance frequency f2 exciting an arc-straightening mode (first waveform signal) and a triangular wave of which the polarity changes alternately at a frequency f3 lower than the acoustic resonance frequency f2.

FIG. 1 shows a waveform of a composite wave including a sine wave with an acoustic resonance frequency f2 exciting n arc-straightening mode (first waveform signal), and a rectangular wave with a frequency f1 (400 Hz in FIG. 1). The frequency f1 is lower than the acoustic resonance frequency f2 and the polarity of the rectangular wave changes alternately at the frequency f1. In short, the composite wave is composed of the sine wave with the acoustic resonance frequency f2 and the rectangular wave with the frequency f1 superposed with each other.

The above-mentioned acoustic resonance frequency f2 exciting an arc-straightening mode is determined by the velocity of sound in a medium in the discharge space of the discharge lamp (which is defined by an arc tube of the discharge lamp) and a length of the discharge space intersecting the arc discharge.

The inventors of the present application experimentally measured the size of curvature of an arc discharge, as well as the state of adhesion of a sealed material to an arc tube while operation of a discharge lamp in the following manner. A composite wave as described above was supplied to the discharge lamp in a horizontal position to operate the discharge lamp, while varying a difference α between the maximum level and the minimum level (a peak-to-peak value) of the sine wave having the acoustic resonance frequency f2 and thus varying a modulation depth α/β (wherein β is an effective value of the composite wave). The results of the experiments are described below.

In the experiments, a 35 W metal halide lamp having the acoustic resonance frequency f2 of 150 kHz was used.

FIG. 2A is a view for describing the measurement of a curvature size L of the curvature of an arc discharge 114 generated. More specifically, an electrode axis 115 is assumed to extend through the centers of a pair of electrodes 112 and 113 disposed inside an arc tube 111 so as to oppose each other. The distance between the electrode axis 115 and the center of the arc discharge 114 in a plane normal to the electrode axis 115 was measured as the curvature size L of the arc discharge 114.

FIG. 2B shows a variation of the curvature size L of the arc discharge 114 measured as described above. As is observed from FIG. 2B, the curvature size L gradually decreases as the modulation depth α/β increases, and when the modulation depth α/β exceeds about 0.3, the size L sharply drops.

FIG. 2C shows the state of adhesion of a sealed material 116 to the arc tube 111 at the operation of the discharge lamp.

The state of adhesion of the sealed material 116 to the arc tube 111 changes at a modulation depth α/β of about 0.6. When the modulation depth α/β is less than about 0.6, the sealed material 116 concentrates in the lower portion of the arc tube 111 due to the gravity. When the modulation depth α/β exceeds about 0.6, the sealed material 116 adheres to the center portion of the arc tube 111 substantially in a strip shape surrounding the arc discharge 114 (FIG. 2A).

The reasons why the sealed material 116 concentrates in the center portion of the arc tube 111 in a strip shape when the modulation depth exceeds about 0.6 and the arc discharge 114 is straightened when the modulation depth exceeds about 0.3 will be described.

The above occurrences are both presumably due to acoustic resonance generated in the arc tube 111: That is, the strip-shaped adhesion of the sealed material 116 is caused by acoustic resonance in an axial direction, while the generation of a straight arc discharge is caused by acoustic resonance in a radial direction. More specifically, the acoustic resonance in a radial direction acts to form a space through which the arc discharge 114 can easily pass in the vicinity of the electrode axis 115 and further forms a space through which the arc discharge 114 cannot easily pass around the former space. As a result, the arc discharge 114 tends to pass through the former space in the vicinity of the electrode axis 115, obtaining the substantially straight arc discharge.

On the other hand, the acoustic resonance in an axial direction which is also generated in the arc tube 111 tends to act to concentrate the sealed material 116 in the plane orthogonal to the electrode axis 115 near the center between the pair of electrodes 112 and 113. This is believed to be the reason why the sealed material 116 adheres to the arc tube 111 in a strip shape.

The force by which acoustic resonance moves a sealed material is proportional to the strength of a compression wave generated in the arc tube 111. The compression wave is generated by a change in a pressure caused by a periodic change in an arc temperature, which in turn results from a periodic change in electric power to be input to the discharge lamp (i.e., a lamp power). In other words, since the force by which acoustic resonance moves a sealed material is proportional to the lamp power, the lamp power may be increased in order to increase the force by which acoustic resonance moves the sealed material.

When a current having a waveform shown in FIG. 1 is supplied to the discharge lamp, as the value α (the peak-to-peak value) of the sine wave with the acoustic resonance frequency f2 increases, i.e., as the modulation depth α/β increases, the width of the periodic change in the lamp power increases. This is presumably the reason why a force sufficiently large enough to move the sealed material 116 to the center portion of the arc tube 111 is generated when the modulation depth α/β exceeds about 0.6, causing the sealed material 116 to adhere to the inner wall of the arc tube 111.

When the force for moving and straightening a gaseous light-weight arc discharge is compared with the force for moving and concentrating a sealed heavier liquid material in the center portion of the arc tube, the latter force is considered to be greater than the former force. Thus, since the force required for straightening the arc discharge can be comparatively small, a sufficient force may be obtained when the modulation depth exceeds about 0.3, resulting in a sharp drop in the curvature size L of the arc discharge when the modulation depth exceeds about 0.3.

From the above experimented results, it has been found that by setting the modulation depth $\alpha/\beta$ at below about 0.6, the arc curvature can be reduced and simultaneously the strip-shaped adhesion of the sealed material which causes a loss of transparency can be prevented. This results in a longer life discharge lamp. In particular, if the modulation depth $\alpha/\beta$ is set in the range of about 0.3 to about 0.6, the arc curvature can be further reduced and thus the life of the discharge lamp can be further extended.

Moreover, when the composite wave including the sine wave with the acoustic resonance frequency f2 and the rectangular wave with the frequency f1 of 400 Hz is applied to the discharge lamp, the polarity of the lamp current changes in correspondence with the period of the rectangular wave with the frequency f1 of 400 Hz. This results in a periodic change in the polarity of the electric field generated in the discharge space. As a result, the occurrence of cataphoresis is prevented and thus variation in the arc color is eliminated.

FIG. 3 is a waveform of a composite wave including a sine wave with the acoustic resonance frequency f2 exciting an arc-straightening mode (first waveform signal), and a triangular wave with a frequency f3. The frequency f3 is lower than the acoustic resonance frequency f2 and the polarity of the triangular wave changes alternately at the frequency f3. In short, the composite wave is composed of the sine wave with the acoustic resonance frequency f2 and the triangular wave with the frequency f3 superposed with each other.

As in the case of using the waveform shown in FIG. 1, described above, by supplying a current having the waveform shown in FIG. 3, of which modulation depth is below about 0.6 to the discharge lamp, the arc curvature can be reduced, and strip-shaped adhesion of the sealed material which causes a loss of transparency of the arc tube can be prevented. Moreover, since the polarity of the electric field generated in the discharge space changes at a period determined by the frequency f3, an occurrence of cataphoresis is prevented.

In the above description, a sine wave is used as the first waveform signal, i.e., the waveform with the acoustic resonance frequency f2 exciting an arc-straightening mode. Any other waveform, such as a triangular wave and a sawtooth wave, can also be used as the first waveform signal as long as the waveform includes a frequency component of the acoustic resonance frequency f2. If the first waveform signal is a sine wave which has been frequency modulated for changing the frequency at a predetermined period and amplitude, it is possible to absorb a change or variation in the acoustic resonance frequency f2 exciting an arc-straightening mode, which tends to occur due to a change or variation in the operation characteristics of the discharge lamp over time.

In addition, in the above description, the rectangular wave with the frequency f1 (FIG. 1) and the triangular wave with the frequency f3 (FIG. 3) are used as the second waveform signal which is to be synthesized with the first waveform signal with the acoustic resonance frequency f2 and has a modulation frequency lower than the frequency f2 at which the polarity changes alternately. Any other waveform, such as a sine wave, a stepped wave, and a sawtooth wave, may also be used as long as the polarity of the waveform changes alternately at a frequency lower than the acoustic resonance frequency f2. A waveform including a small amount of a DC component can also be used as long as the polarity thereof changes. A waveform of which positive and negative phases are asymmetric can also be used. In other words, the above-described effect can be obtained by using such a waveform that prevents the direction of electric field in the discharge space of the discharge lamp from being maintained in one direction so as to avoid the occurrence of cataphoresis, and synthesizing the waveform with the first waveform signal with the acoustic resonance frequency f2.

Hereinbelow, embodiments achieved based on the principles of the present invention described above will be described with reference to the relevant drawings.

Embodiment 1

Figure 4:
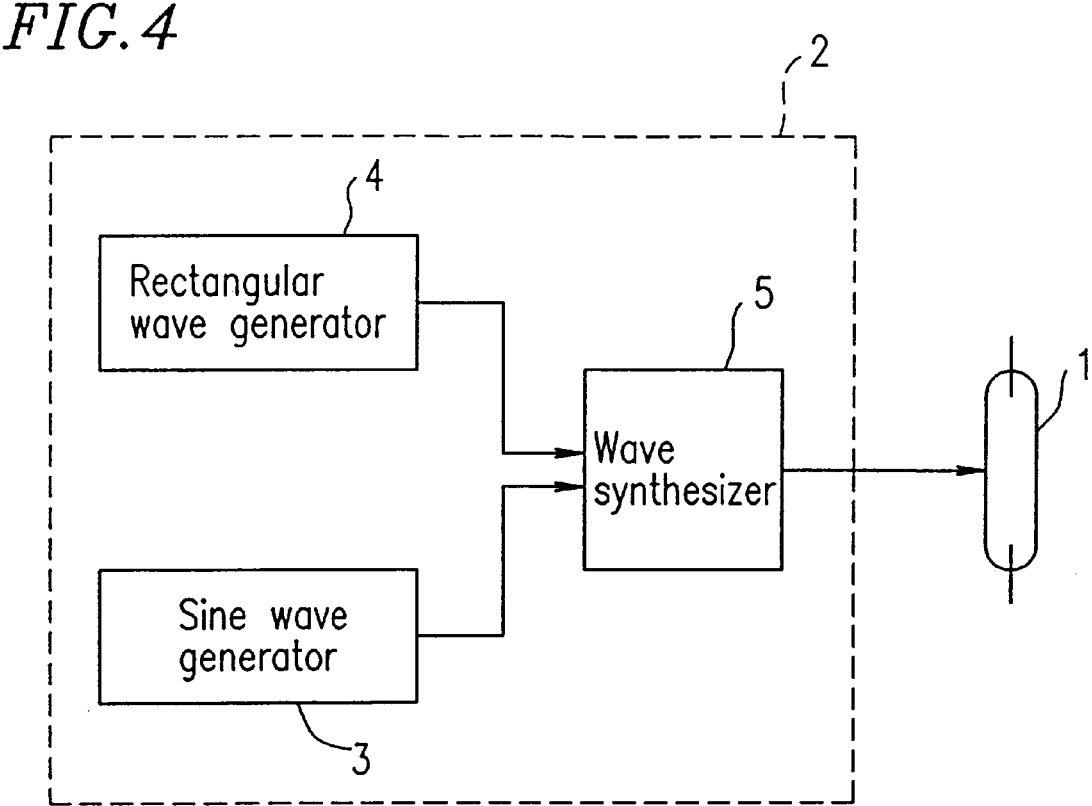
FIG. 4 is a schematic view illustrating a construction of a discharge lamp operating apparatus of Embodiment 1 according to the present invention.

FIG. 4 is a schematic diagram of a discharge lamp operating apparatus 2 of Embodiment 1 according to the present invention. The operating apparatus 2 of this embodiment is used for a 35 W metal halide lamp, for example.

Referring to FIG. 4, a 35 W metal halide lamp 1 is a discharge lamp having mercury and metal halide (Sc—Na halides) sealed in an arc tube. An operating apparatus 2 supplies a current with a predetermined waveform to the 35 W metal halide lamp 1. The operating apparatus 2 includes a sine wave generator 3, a rectangular wave generator 4, and a wave synthesizer 5. The sine wave generator 3 generates a 150 kHz sine wave as the first waveform signal with a frequency component of the acoustic resonance frequency f2 exciting an arc-straightening mode. The rectangular wave generator 4 generates a 400 Hz rectangular wave and serves as a polarity-changing power supply for outputting a waveform with a frequency lower than the acoustic resonance frequency f2 at which the polarity of the waveform changes alternately. The wave synthesizer 5 synthesizes the output of the sine wave generator 3 and the output of the rectangular wave generator 4.

Figure 5A:
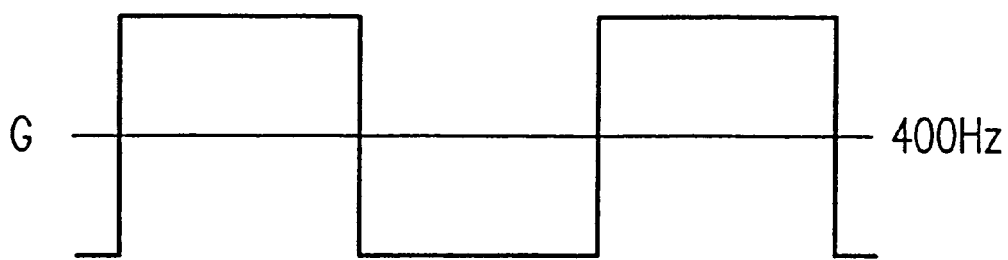
FIGS. 5A to 5C are views illustrating waveforms of currents output from components of the apparatus shown in FIG. 4.
Figure 5B:
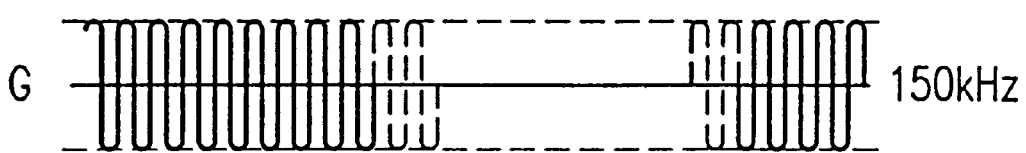
Figure 5C:
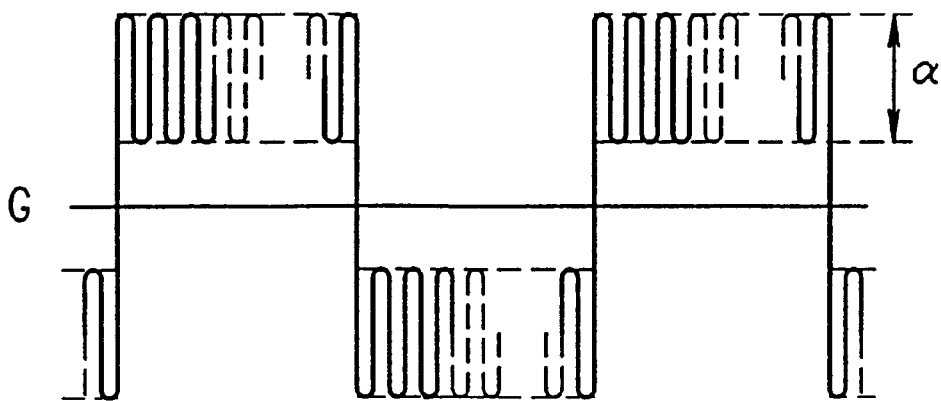

FIGS. 5A, 5B, and 5C show the waveforms output from the respective components shown in FIG. 4: FIG. 5A shows the waveform of the 400 Hz rectangular wave output from the rectangular wave generator 4, FIG. 5B shows the waveform of the 150 kHz sine wave output from the sine wave generator 3, and FIG. 5C shows the waveform of the superposed wave of the output of the sine wave generator 3 and output of the rectangular wave generator 4 generated by the wave synthesizer 5. The output of the sine wave generator 3 and the output of the rectangular wave generator 4 are adjusted so that the modulation depth of the superposed waveform shown in FIG. 5C is less than about 0.6. The waveform shown in FIG. 5C is applied to the 35 W metal halide lamp 1.

Thus, in Embodiment 1, the operating apparatus 2 can apply to the 35 W metal halide lamp 1 a composite wave as shown in FIG. 5C having a modulation depth of less than about 0.6 formed by superposing a sine wave with the acoustic resonance frequency f2 (150 kHz in the illustrated example) exciting an arc-straightening mode and a rectangular wave with a frequency of 400 Hz. By applying such a composite wave, a straight arc discharge free of variation in color can be achieved, and strip-shaped adhesion of the sealed material to the inner wall of the center portion of the arc tube can be prevented.

Embodiment 2

Figure 6:
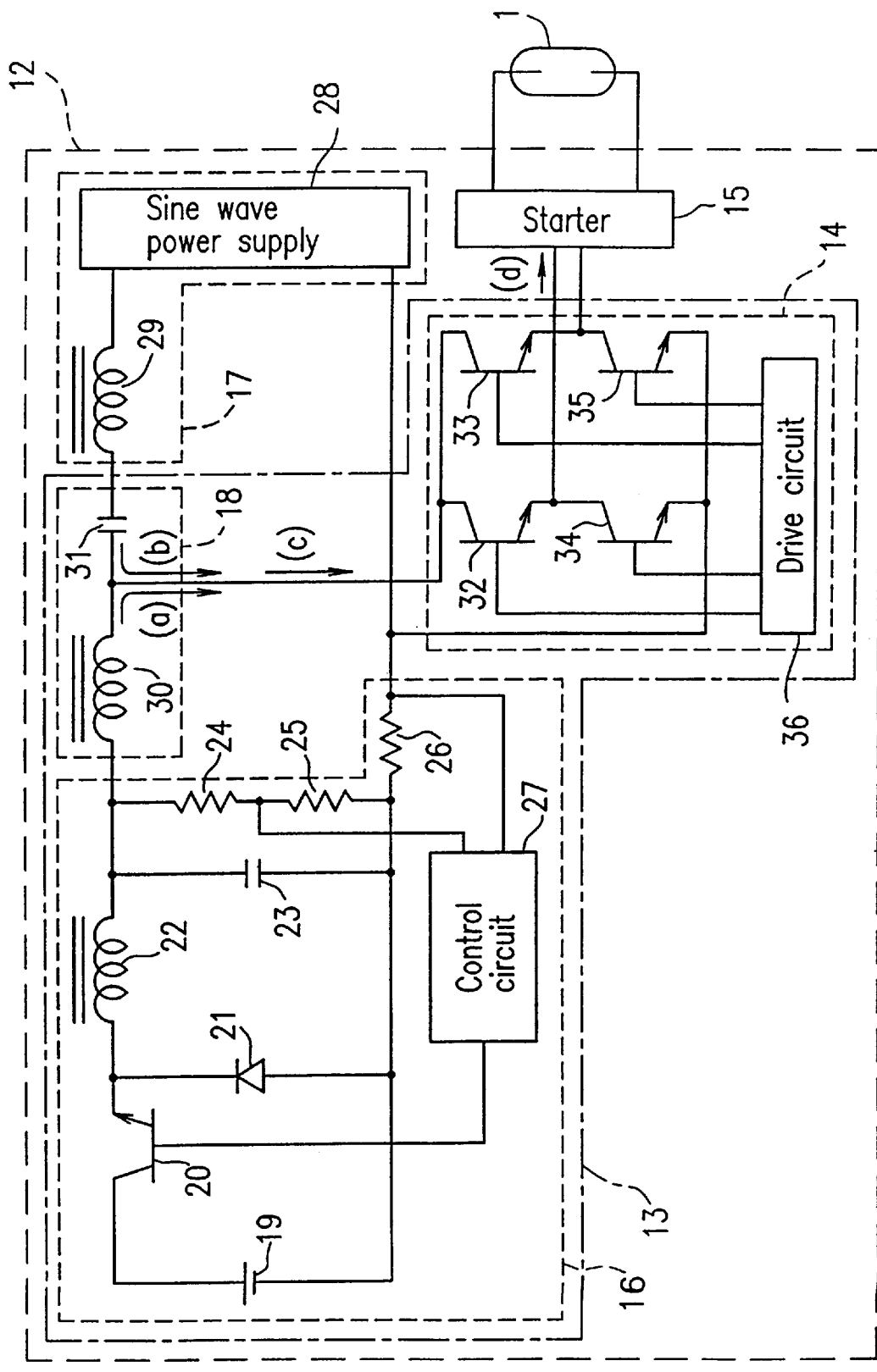
FIG. 6 is a schematic view illustrating a construction of a discharge lamp operating apparatus of Embodiment 2 according to the present invention.

FIG. 6 is a schematic diagram of a discharge lamp operating apparatus 12 of Embodiment 2 according to the present invention.

Referring to FIG. 6, a 35 W metal halide lamp similar to that described in Embodiment 1 is used for the discharge lamp 1. An operating apparatus 12 supplies a current with a predetermined waveform to the 35 W metal halide lamp 1. The operating apparatus 12 includes a high frequency power supply 17, a modulation section 13, and a starter 15. The high frequency power supply 17 generates a 150 kHz sine wave as the first waveform signal having a frequency component of the acoustic resonance frequency f2 exciting an arc-straightening mode. The modulation section 13 modulates the output from the high frequency power supply 17 so that the polarity thereof alternately changes at a modulation frequency lower than the acoustic resonance frequency f2. The starter 15 applies a high voltage sufficient to cause the 35 W metal halide lamp 1 to start discharging.

The modulation section 13 includes a DC power supply 16, a superposing circuit 18, and a rectangular wave conversion circuit 14. The DC power supply 16 outputs a DC signal in which an instantaneous value does not change over time. The superposing circuit 18 superposes the output of the high frequency power supply 17 on the output of the DC supply 16. The rectangular wave conversion circuit 14 is an inverter circuit for alternately changing the polarity of the output from the superposing circuit 18 at a modulation frequency lower than the acoustic resonance frequency f2.

FIGS. 7A to 7D show the waveforms of currents output from the respective components shown in FIG. 6.

Figure 7A:
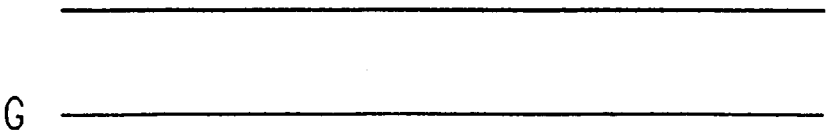
FIGS. 7A to 7D are views illustrating waveforms of currents output from components of the apparatus shown in FIG. 6.

FIG. 7A shows the waveform of the output current from the DC power supply 16 (an arrow (a) in FIG. 6).

The DC power supply 16 includes a voltage step-down chopper circuit composed of a DC power source 19, a transistor 20, a diode 21, a choke coil 22, and a capacitor 23. The DC power supply 16 also includes a control circuit 27 which calculates the lamp power based on a signal corresponding to a lamp voltage detected at resistances 24 and 25 and a signal corresponding to a lamp current detected at a resistance 26, and controls the on/off ratio of the transistor 20 so that the calculated lamp power is maintained at a constant value of 35 W. By the above operation, a DC waveform as shown in FIG. 7A in which an instantaneous value does not change over time is output from the DC power supply 16.

Figure 7B:
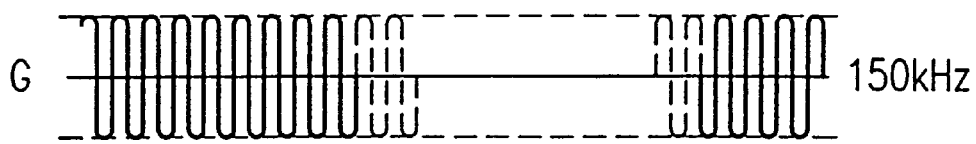

FIG. 7B shows the waveform of the output current from the high frequency power supply 17 (an arrow (b) in FIG. 6).

The high frequency power supply 17 includes a sine wave power supply 28 for outputting a sine wave with the acoustic resonance frequency f2 (150 kHz) and a choke coil 29 for limiting the current output from the sine wave power supply 28 to a modulation depth of less than about 0.6. By the above operation, a sine wave current with the acoustic resonance frequency f2 (150 kHz) as shown in FIG. 7B is output from the high frequency power supply 17.

Figure 7C:
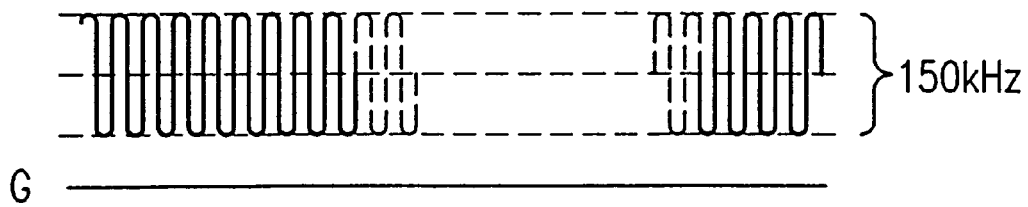

FIG. 7C shows the waveform of the output current from the superposing circuit 18 (an arrow (c) in FIG. 6).

The superposing circuit 18 includes a choke coil 20 and a capacitor 31. The capacitor 31 outs the DC component so as to prevent the current output from the DC power supply 16 from flowing to the high frequency power supply 17. The choke coil 30 cuts the high frequency component so as to prevent the current output from the high frequency power supply 17 from flowing to the DC power supply 16. The point connecting the choke coil 30 and the capacitor 31 is an output terminal of the superposing circuit 18, from which a DC current with the sine wave with the acoustic resonance frequency f2 (150 kHz) superposed thereon, as shown in FIG. 7C, is output.

Figure 7D:
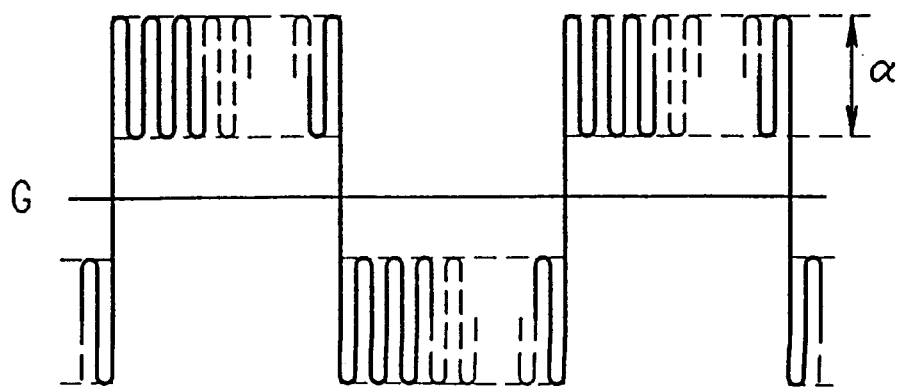

FIG. 7D shows the waveform of the output current from the rectangular wave conversion circuit 14 (an arrow (d) in FIG. 6).

The rectangular wave conversion circuit 14 includes transistors 32, 33, 34, and 35 and a drive circuit 36. The rectangular wave conversion circuit 14 alternately generates a period in which the transistors 32 and 35 are turned on and a period in which the transistors 33 and 34 are turned on by varying an output signal from the drive circuit 36. In this way, the DC current with the sine wave with the acoustic resonance frequency f2 (150 kHz) superposed thereon, as shown in FIG. 7C, is converted to an AC current with a frequency of 400 Hz as shown in FIG. 7D, which is then supplied to the 35 W metal halide lamp 1.

Thus, in Embodiment 2, once the 35 W metal halide lamp 1 is started to operate by the starter 15 applying a high voltage, the operating apparatus 2 can supply to the metal halide lamp 1 a composite wave current (modulation depth: below about 0.6) as shown in FIG. 7D including a sine wave with the acoustic resonance frequency f2 (150 kHz) exciting an arc-straightening mode and a rectangular wave with a frequency (400 Hz in the illustrated example) lower than the acoustic resonance frequency f2. By applying such a composite wave, a straight arc discharge free of variation in color can be achieved, and strip-shaped adhesion of the sealed material to the inner wall of the center portion of the arc tube can be prevented.

The modulation depth of the composite waveform shown in FIG. 7D can be varied freely by changing the output voltage of the sine wave power supply 28.

Embodiment 3

Figure 8:
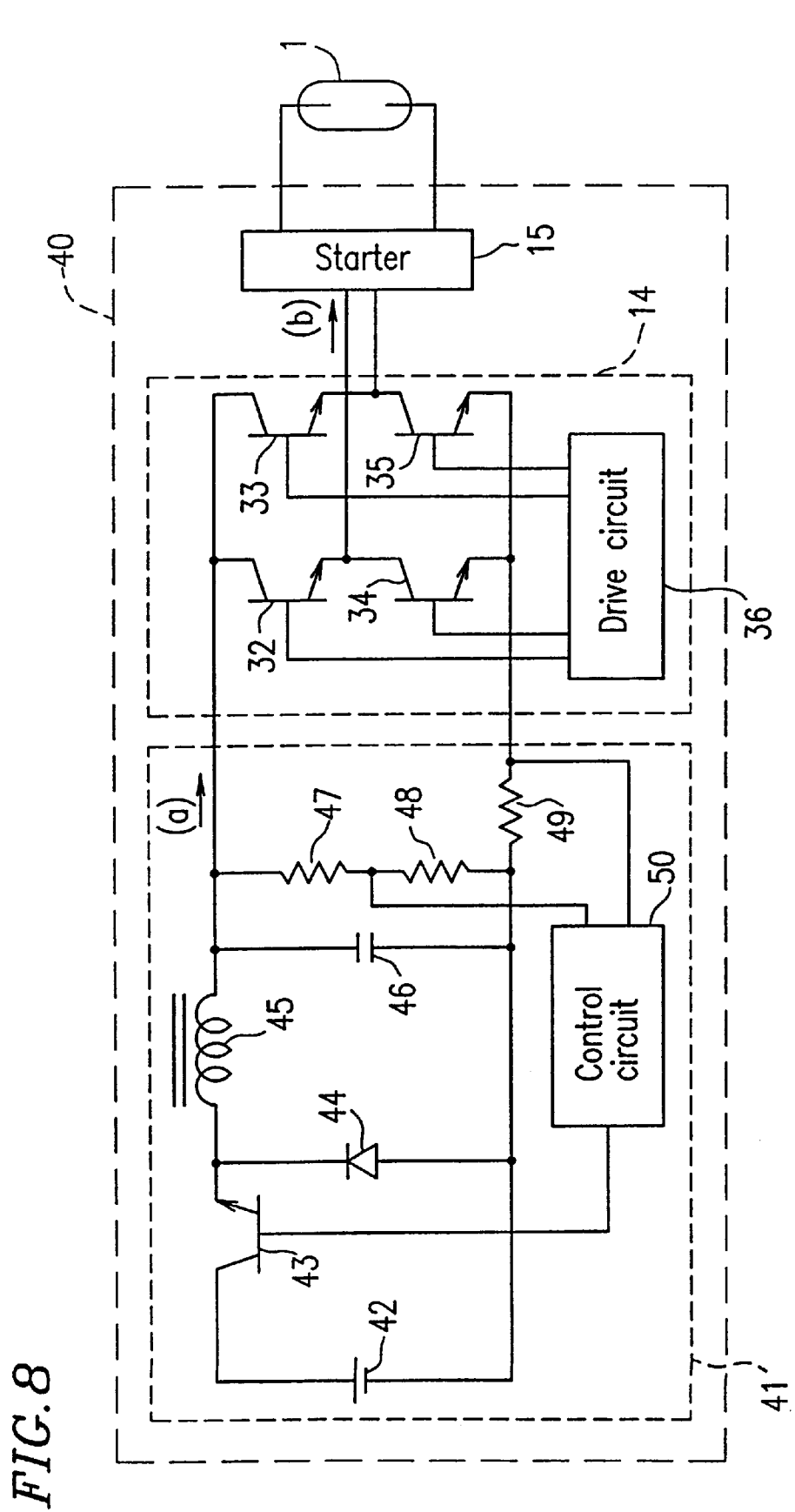
FIG. 8 is a schematic view illustrating a construction of a discharge lamp operating apparatus of Embodiment 3 according to the present invention.

FIG. 8 is a schematic diagram of a discharge lamp operating apparatus 40 of Embodiment 3 according to the present invention.

Referring to FIG. 8, a 35 W metal halide lamp similar to that described in Embodiments 1 and 2 is used for the discharge lamp 1. An operating apparatus 40 supplies a current to the 35 W metal halide lamp 1 for starting and operating the metal halide lamp 1. The operating apparatus 40 includes a DC power supply 41 for generating the first waveform signal, a rectangular wave conversion circuit 14, and a starter 15. The rectangular wave conversion circuit 14 is an inverter circuit for changing the polarity of the output from the DC power supply 41 at a frequency lower than the acoustic resonance frequency f2. The starter 15 applies a high voltage sufficient to cause the 35 W metal halide lamp 1 to start discharging.

The DC power supply 41 outputs a DC signal superposed with a waveform having a frequency component of the acoustic resonance frequency f2 exciting an arc-straightening mode as the first waveform signal. The configurations of the rectangular wave conversion circuit 14 and the starter 15 are the same as those described in Embodiment 2. The description of these components are therefore omitted here.

The present embodiment is different from Embodiment 1 described above in the configuration of the DC power supply 41 which is a means for generating the first waveform signal having a frequency component of the acoustic resonance frequency f2 exciting an arc-straightening mode. The configuration and operation of the DC power supply 41 will be described.

The DC power supply 41 includes a voltage step-down chopper circuit composed of a DC power source 42, a transistor 43 as a switching element, a diode 44, a choke coil 45, and a capacitor 46. The DC power supply 41 also includes a control circuit 50 which calculates a lamp power based on a signal corresponding to a lamp voltage detected at resistances 47 and 48 and a signal corresponding to a lamp current detected at a resistance 49, and controls the on/off ratio of the transistor 43 so that the calculated lamp power is maintained at a constant value of 35 W. In such a configuration of the DC power supply 41, the on/off frequency of the transistor 43 is set at the acoustic resonance frequency f2 (150 kHz) exciting an arc-straightening mode. In addition, a filter circuit composed of the choke coil 45 and the capacitor 46 is adjusted to have operation characteristics which do not cut a frequency component of 150 kHz, and the modulation depth of the output wave from the filter circuit is set at a predetermined value less than about 0.6. Thus, the waveform of the output current from the DC power supply 41 is a DC current having a modulation depth of less than about 0.6 which periodically changes at a frequency of 150 kHz.

FIGS. 9A and 9B show the waveforms of the output current from the DC power supply 41 (an arrow (a) in FIG. 8) and the output current from the rectangular wave conversion circuit 14, (an arrow (b) in FIG. 8), respectively.

Thus, in Embodiment 3, as in Embodiments 1 and 2, the operating apparatus 40 can supply to the 35 W metal halide lamp 1 a composite wave current (modulation depth: less than about 0.6) as shown in FIG. 9B including a sine wave with the acoustic resonance frequency f2 (150 kHz) exciting an arc-straightening mode and a rectangular wave with a frequency (400 Hz in the illustrated example) lower than the acoustic resonance frequency f2. By applying such a composite wave, a straight arc discharge free of variation in color can be achieved, and strip-shaped adhesion of the sealed material to the inner wall of the center portion of the arc tube can be prevented.

In the construction shown in FIG. 8, the choke coil 45 and the capacitor 46 are adjusted to have predetermined operation characteristics and the on/off frequency of the transistor 43 is set at the acoustic resonance frequency f2 (150 kHz) which can straighten an arc discharge. By such a simple adjustment, it is possible to provide a predetermined modulation depth to the rectangular wave. As a result, the construction of the operating apparatus is simplified.

Embodiment 4

FIG. 4 is a schematic diagram of a discharge lamp operating apparatus 59 of Embodiment 4 according to the present invention.

Figure 10:
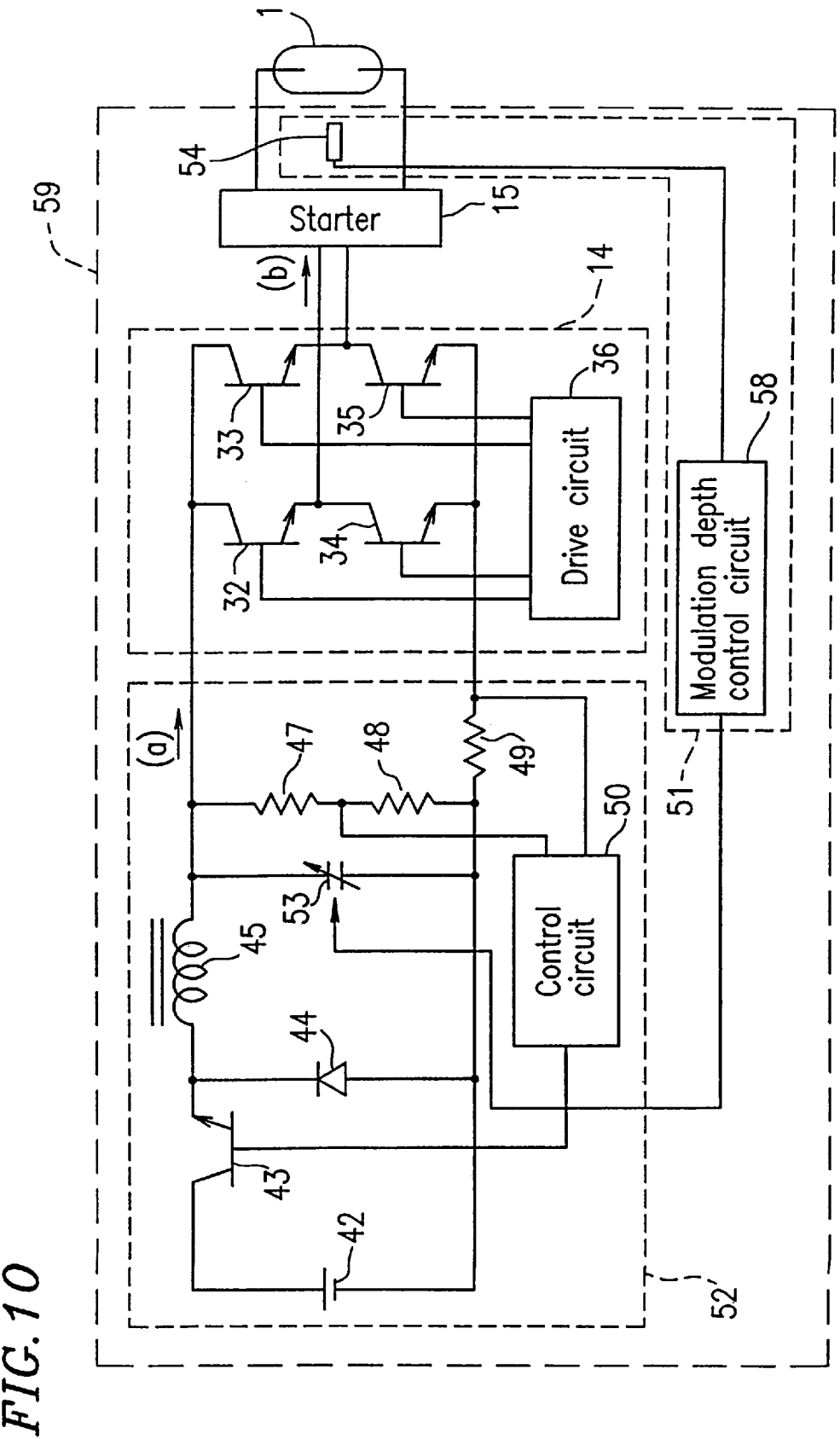
FIG. 10 is a schematic view illustrating a construction of a discharge lamp operating apparatus of Embodiment 4 according to the present invention.

The construction shown in FIG. 10 is different from the construction of Embodiment 3 shown in FIG. 8 in that the former additionally includes a modulation depth control section 51 and that a variable capacitor 53 is used for a DC power supply 52 in place of the capacitor 46 for the DC power supply 41 shown in FIG. 8. The modulation depth control section 51 detects the state of adhesion of a sealed material to the inner wall of an arc tube during the operation of the discharge lamp 1 and changes the modulation depth α/β of a current to be supplied to the discharge lamp 1 depending on the detected adhesion state. The other components in FIG. 10 are the same as those in FIG. 8 and are denoted by the same reference numerals as those in FIG. 8. Description of such components are therefore omitted here.

The modulation depth control section 51 includes a light receiving portion 54 and a modulation depth control circuit 58. The light receiving portion 54 is disposed in the vicinity of the 35 W metal halide lamp 1 for serving as a detector which detects whether or not a sealed material in the arc tube has adhered to the inner wall of the arc tube during the operation of the lamp 1. The modulation depth control circuit 58 changes the capacitance of the capacitor 53 depending on a signal received from the light receiving portion 54 thereby changing the modulation depth α/β. The light receiving portion 54 is located so close to the arc tube of the discharge lamp 1 as to receive local light 120 which has passed through a portion of the arc tube in which the sealed material in the arc tube adheres to the arc tube in a strip shape (i.e., the center portion of the arc tube).

The operation of the discharge lamp operating apparatus 59 of Embodiment 4 with the above construction will be described.

First, referring to FIG. 11, how strip-shaped adhesion of a sealed material is detected will be described.

Light 120 emitted from an arc discharge is transmitted through an arc tube 111. When a sealed material 116 adheres to the arc tube 111 in a strip shape, the sealed material 116 in the adhering portion reflects and absorbs light, causing the light transmission spectral characteristics to be locally changed. In other words, for light with a certain wavelength, the amount of transmitted light is significantly different in the case where the light is transmitted through the area where the sealed material adheres to the arc tube and in the case where the light is transmitted through the area where the sealed material does not adhere to the arc tube. By constructing the light receiving portion 54 so that a change in the amount of transmitted light for such light with a certain wavelength can be detected, the existence of the sealed material 116 (i.e., the state of adhering of the sealed material 116 to the arc tube) can be detected.

Figure 11:
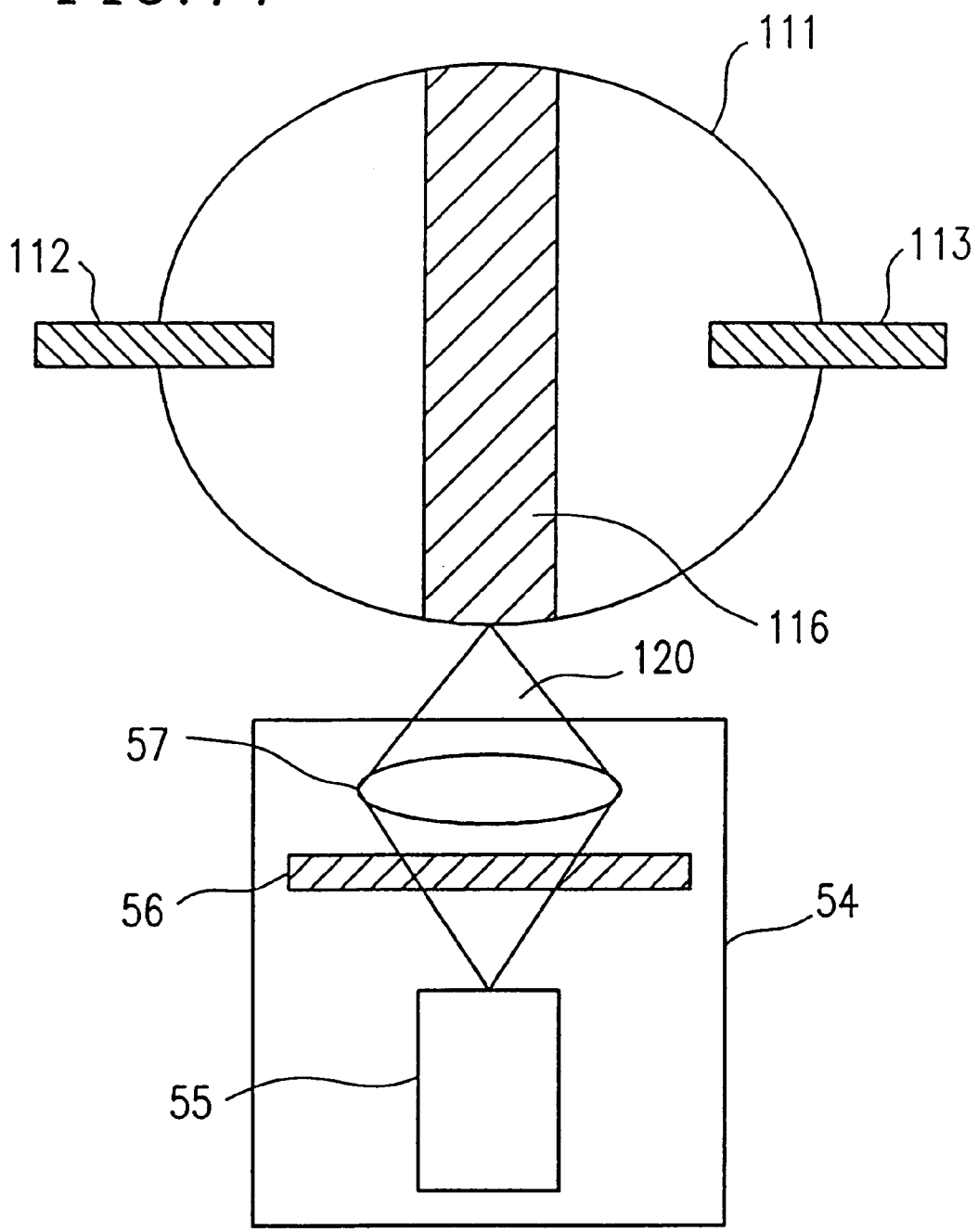
FIG. 11 is a schematic view illustrating a light receiving portion of the operating apparatus shown in FIG. 10.

Specifically, referring to FIG. 11, the light receiving portion 54 includes a photodiode 55, a filter 56, and a lens 57. Among light rays generated by arc discharge between electrodes 112 and 113, a local light ray 120 transmitted through the portion of the arc tube 111 to which the sealed material 116 adheres in a strip shape is collected by the lens 57, and received by the photodiode 55 through the filter 56.

For example, if the sealed material 116 is a Sc—Na iodine, which is light yellow in color, it has a property of absorbing blue light. Therefore, if the sealed material (iodine) 116 adheres to the arc tube 111 in a strip shape, the amount of blue light among the light rays 120 transmitted through the adhering iodine 116 is significantly reduced. Thus, by measuring the amount of transmitted blue light, it is possible to detect whether or not the iodine 116 adheres to the arc tube 111 in a strip shape. In this case, a blue transmitting filter is used as the filter 56 of the light receiving portion 54.

As described above, blue light is hardly contained in the light 120 received by the light receiving portion 54 when the iodine 116 adheres to the arc tube 111 in a strip shape. Accordingly, light is barely input to the photodiode 55, and thus the output of the light receiving portion 54 is almost zero. Consequently, the modulation depth control circuit 58 determines that the iodine 116 adheres in a strip shape.

If there is no stripe-shaped adhesion of the iodine 116 to the arc tube 111, light 120 which is input to the light receiving portion 54 contains blue light. Therefore, the light transmitted through the filter 56 is input to the photodiode 55. Then, the light receiving portion 54 outputs a signal proportional to the amount of light input to the photodiode 55 to the modulation depth control circuit 58. The modulation depth control circuit 58 determines that no strip-shape adhesion of the iodine 116 has occurred if the signal from the light receiving portion 54 is equal to or greater than a predetermined value.

Figure 12:
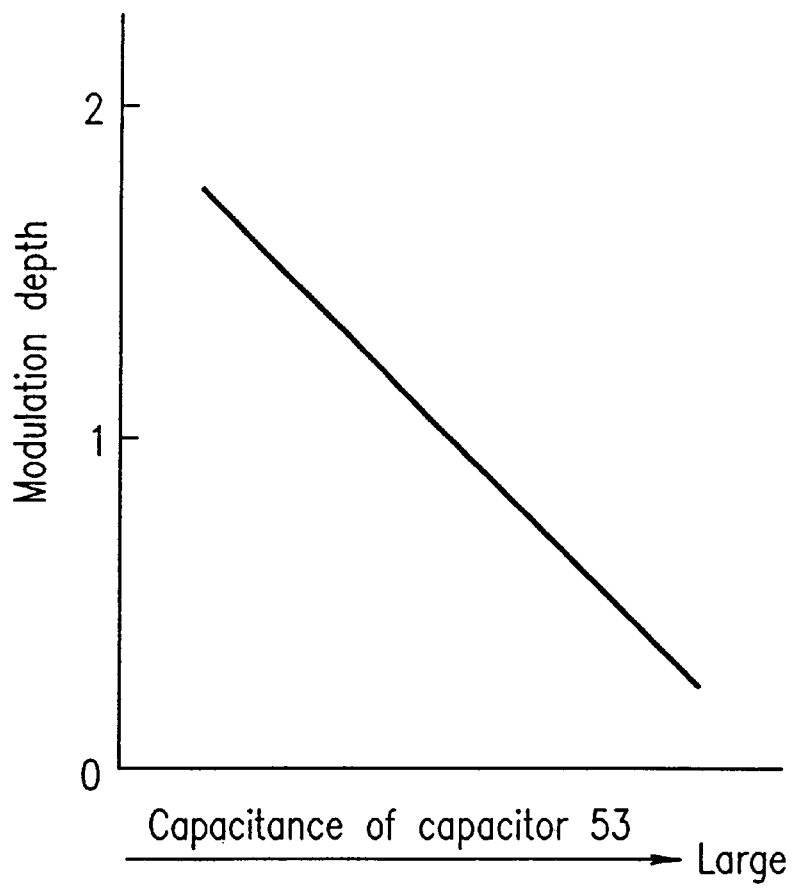
FIG. 12 is a graph showing the relationship between the capacitance of a capacitor of the operating apparatus shown in FIG. 10 and the modulation depth.
Figure 13:
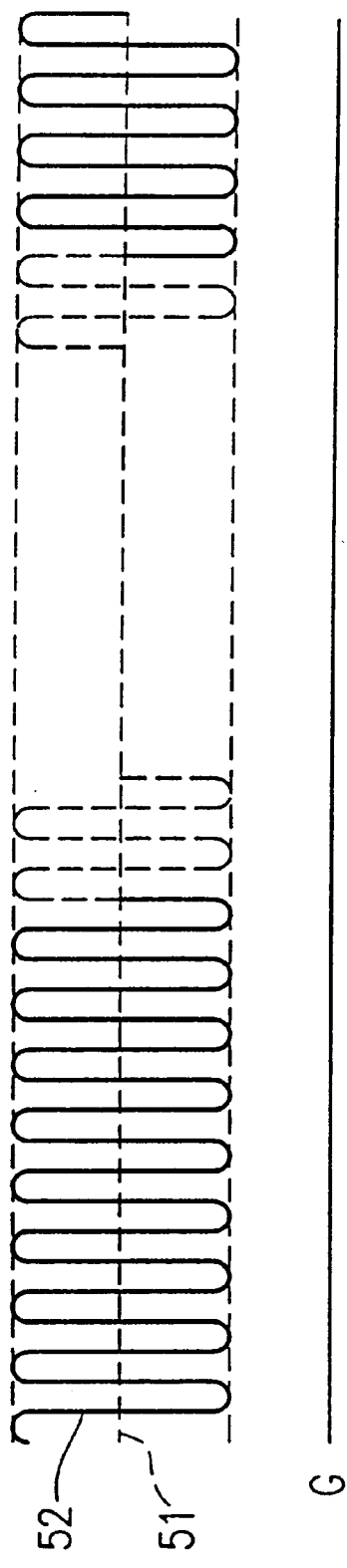
FIG. 13 is a view illustrating a waveform of a lamp current during the operation of a discharge lamp supplied by a conventional discharge lamp operating apparatus.
Figure 14:
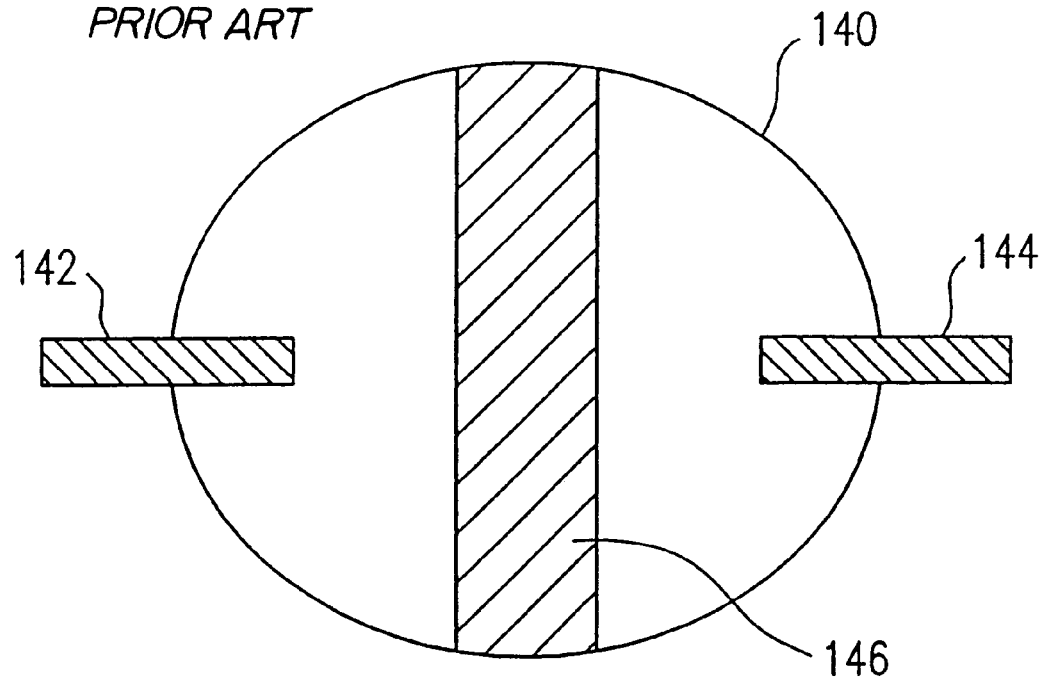
FIG. 14 is a schematic view illustrating a state of adhesion of a sealed material to an arc tube during the operation of a discharge lamp by the conventional discharge lamp operating apparatus.

The modulation depth and the capacitance of the capacitor 53 have a relationship as shown in FIG. 12. That is, as the capacitance of the capacitor 53 increases, the modulation depth decreases. Therefore, the modulation depth control circuit 58 acts to reduce the capacitance of the capacitor 53 of the DC power supply 52 in order to obtain a large modulation depth, and in reverse increase the capacitance of the capacitor 53 in order to obtain a small modulation depth. The modulation depth is thus controlled by such an adjustment in the capacitance of the capacitor 53 by the modulation depth control circuit 58.

Thus, in Embodiment 4, the state of adhesion of a sealed material during the operation of the metal halide lamp (discharge lamp) 1 is detected by the light receiving portion 54. Based on the detection results, the modulation depth of a current to be supplied to the discharge lamp 1 is changed by the modulation depth control circuit 58. This enables the 35 W metal halide lamp 1 to be operated at a modulation depth at which the arc curvature is smallest under the condition where no strip-shaped adhesion of a sealed material occurs. Further, variation in the modulation depth at which strip-shaped adhesion of a sealed material occurs, which may be generated due to calibration at the manufacture of the 35 W metal halide lamp 1 and a change of the construction over time, can be absorbed.

In the above embodiments, the 35 W metal halide lamp is used as the discharge lamp 1. Any other lamp can also be used as long as the lamp contains a sealed material which is liquid in the arc tube during the operation of the discharge lamp. The sealed material in the discharge lamp may include at least a metal halide or mercury.

In the above embodiment, the rectangular wave generator 4 generates a standard rectangular wave. Alternatively, a trapezoidal wave having a sloping rising edge and/or falling edge or a quasi-rectangular wave may be generated. Likewise, the rectangular wave conversion circuit 14 may be otherwise constructed as long as it can convert an input to a quasi-rectangular wave. The rectangular wave generator 4 and the rectangular wave conversion circuit 14 may also generate any type of wave other than a rectangular wave and a quasi-rectangular wave, such as a sine wave, a triangular wave, a stepped wave, and a sawtooth wave, as long as the frequency of the waveform is lower than the acoustic resonance frequency f2 exciting an arc-straightening mode and the polarity of the waveform changes alternately at this frequency. Moreover, the waveform may include a small amount of DC component as long as the polarity changes, and a waveform of which positive and negative phases are asymmetric may also be used.

More specifically, the effects of the present invention described above can be obtained by using any waveform whereby the direction of electric field produced in the discharge space of the discharge lamp is prevented from being maintained in one direction so as to avoid the occurrence of cataphoresis, and synthesizing the waveform with the first waveform signal with the acoustic resonance frequency f2.

While the frequency used by the rectangular wave generator 4 and the rectangular wave conversion circuit 14 is described as 400 Hz, any frequency lower than the acoustic resonance frequency f2 exciting an arc-straightening mode can be used.

While the sine wave generator 3 and the high frequency power supply 17 are described as generating a 150 kHz sine wave, they may be configured to generate any other waveform having a frequency component of the acoustic resonance frequency f2. For example, a triangular wave or a sawtooth wave may be generated. This is also applicable to the sine wave power supply 28.

A change and variation in the acoustic resonance frequency f2 exciting an arc-straightening mode, which arises from aging and variation in the operation characteristics of the discharge lamp, can be reduced by additionally providing a frequency modulation (FM) function to the sine wave generator 3 and the sine wave power supply 28 so that the generated sine wave can be adjusted to a predetermined period and width. The same effect can also be obtained if the on/off frequency of the transistor 43 in Embodiment 3 can be frequency-modulated using a signal from the control circuit 50.

In the above description, the high frequency power supply 17 includes the sine wave power supply 28 and the choke coil 29 so that the output current of the sine wave power supply 28 is limited by the impedance of the choke coil 29 to achieve a predetermined modulation depth. The same effect can also be obtained by using a circuit element other than the choke coil (e.g., a resistance or a capacitor) or a composite structure composed of such circuit elements.

The DC power supply 16 is described as including the step-down chopper circuit which outputs a waveform in which an instantaneous value does not change over time. The same effect can also be obtained by using other circuit designs such as a voltage step-up chopper circuit and an inverting chopper circuit.

The control circuits 27 and 50 are described as controlling the on/off ratio of the transistors 20 and 43, respectively, so that the lamp power of the discharge lamp 1 remains a constant value of 35 W. Alternatively, in order to compensate for light output when the lamp is started, such control circuits may be controlled so as to supply power exceeding the rated operation value during the initial operation of the lamp. The control circuits 27 and 50 can also be constructed to vary the lamp characteristics to achieve light modulation control and the like.

While the superposing circuit 18 is described as including the choke coil 30 and the capacitor 31, other configurations can also be used.

The DC power supply 41 can also be constructed using a step-up chopper circuit, an inverting chopper circuit, a forward converter circuit, or any other circuit design, in place of the circuit configuration described above, as long as a DC output with a waveform having a frequency component of the acoustic resonance frequency f2 superposed thereon can be output. While a transistor is used as the switching element in the above circuit configuration, other switching elements such as an FET, a thyristor, and an IGBT can also be used.

In Embodiment 4, the light receiving portion 54 including the photodiode 55, the filter 56, and the lens 57 is used as the means for detecting the state of a sealed material during the operation of the discharge lamp 1. Any other construction which can detect whether or not strip-shaped adhesion of the sealed material to the arc tube has occurred during the operation can be used. For example, a CCD camera or the like may be used to take images of the discharge lamp 1 to detect such adhesion by an image processing technique. A blue transmitted filter is described as being used as the filter 56 when the sealed material is an iodine. Alternatively, a filter for transmitting any other color may be used as long as it can detect light with a predetermined wavelength in which a significant difference in the transmitted light amount is observed between in the case where the iodine adheres to the arc tube and in the case where the iodine does not adhere to the arc tube. It would be understood that a different type of the filter 56 must be used when the sealed material in the arc tube is different.

Thus, according to the present invention, a current of a composite wave including a waveform having a frequency component of an acoustic resonance frequency exciting an arc-straightening mode, and a waveform with a frequency lower than the acoustic resonance frequency at which the polarity of the waveform changes alternately is supplied to the discharge lamp, to operate the discharge lamp. In this operation, the modulation depth $\alpha/\beta$ of the composite wave to be supplied is set at such a value that strip-shaped adhesion of a sealed material to the center portion of the arc tube of the discharge lamp can be prevented. By this setting, a straight arc discharge without variation in color can be achieved, and strip-shaped adhesion of the sealed material to the center portion of the arc tube of the discharge lamp during the operation of the discharge lamp can be prevented. Thus, the life of the discharge lamp can be extended.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An operating apparatus of a discharge lamp for operating the discharge lamp having an arc tube defining a discharge space, comprising:

generation means for generating a first waveform signal having a frequency component of an acoustic resonance frequency exciting a mode which straightens an arc discharge, a center line of a waveform of the first waveform signal being maintained at a fixed level; and modulation means for modulating the first waveform signal periodically so that a polarity of the center line of the first waveform signal changes alternately at a modulation frequency which is lower than the acoustic resonance frequency, and generating a modulated signal, wherein a modulation depth $\alpha/\beta$, where $\alpha$ is a peak-to-peak amplitude of the first waveform signal and $\beta$ is an effective value of an amplitude of the modulated signal, is set at such a value that a sealed material in the arc tube is prevented from adhering to a center portion of the arc tube in substantially a strip shape.

2. An operating apparatus of a discharge lamp according to claim 1, wherein the acoustic resonance frequency is determined by the velocity of sound in a medium in the discharge space of the discharge lamp and a length of the discharge space intersecting the arc discharge.

3. An operating apparatus of a discharge lamp according to claim 1, wherein the sealed material includes at least a metal halide or mercury.

4. An operating apparatus of a discharge lamp according to claim 1, wherein the value of the modulation depth $\alpha/\beta$ is equal to or less than about 0.6.

5. An operating apparatus of a discharge lamp according to claim 4, wherein the value of the modulation depth $\alpha/\beta$ is in the range from about 0.3 to about 0.6.

6. An operating apparatus of a discharge lamp according to claim 1, further comprising modulation depth control means for detecting a state of strip-shaped adhesion of the sealed material to a wall of the arc tube during the operation of the discharge lamp and changing the value of the modulation depth $\alpha/\beta$ depending on the detection results.

7. An operating apparatus of a discharge lamp according to claim 6, wherein the modulation depth control means detects a light output from the discharge lamp.

* * * * *